United States Patent [19]

Goes et al.

[11] 4,055,983
[45] Nov. 1, 1977

[54] FLUIDIC GAP GAUGE

[75] Inventors: Michael J. Goes, Dover; John R. Masly, Landing, both of N.J.

[73] Assignee: The United States of America as represented by the Secretary of the Army, Washington, D.C.

[21] Appl. No.: 754,936

[22] Filed: Dec. 28, 1976

[51] Int. Cl.² ............................................. G01B 13/12
[52] U.S. Cl. ................................................... 73/37.5
[58] Field of Search ...................... 73/37.5, 167, 37.9; 137/557

[56] References Cited

U.S. PATENT DOCUMENTS 3,844,162  10/1974  Picozzi ................................. 73/37.5
3,962,903  6/1976  Firdaus ................................. 73/37.5

*Primary Examiner*—Donald O. Woodiel

*Attorney, Agent, or Firm*—Nathan Edelberg; A. Victor Erkkila; Max Yarmovsky

[57] ABSTRACT

A split-ring hermetically sealed pressure enclosure is positioned around a gap formed between a shell body and base plate of a projectile for the purpose of measuring an unknown gap volume and comparing it to a standard acceptable volume. The system utilizes a gauging system which pressurizes both the known volume of the standard volume and unknown volume of the test body simultaneously and then measures the rate at which each volume is depleted. Fluidic sensing, amplifying, and gating systems are utilized for generating an output signal responsive to comparative pressure rate changes of both standard and test volumes. The output signal is used to operate a visual, biased, no-go, go pneumatic indicator.

4 Claims, 4 Drawing Figures

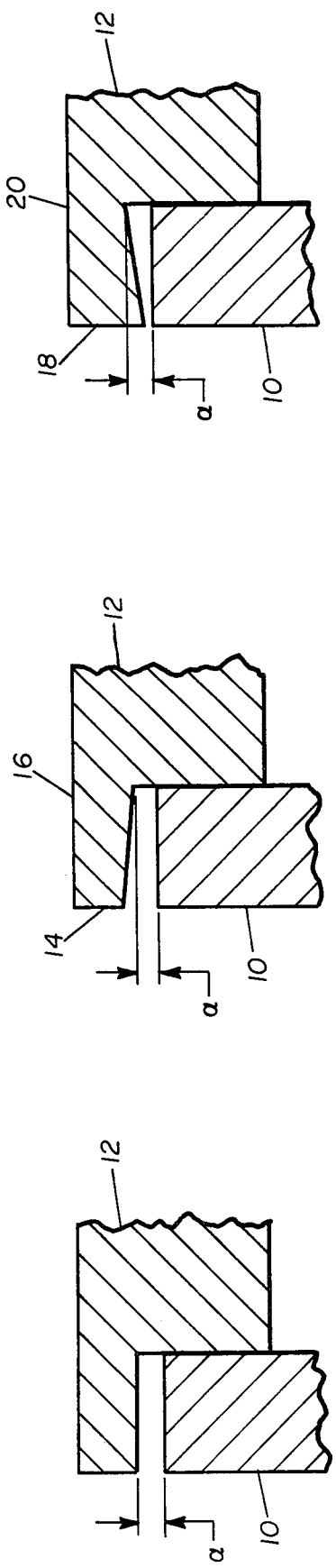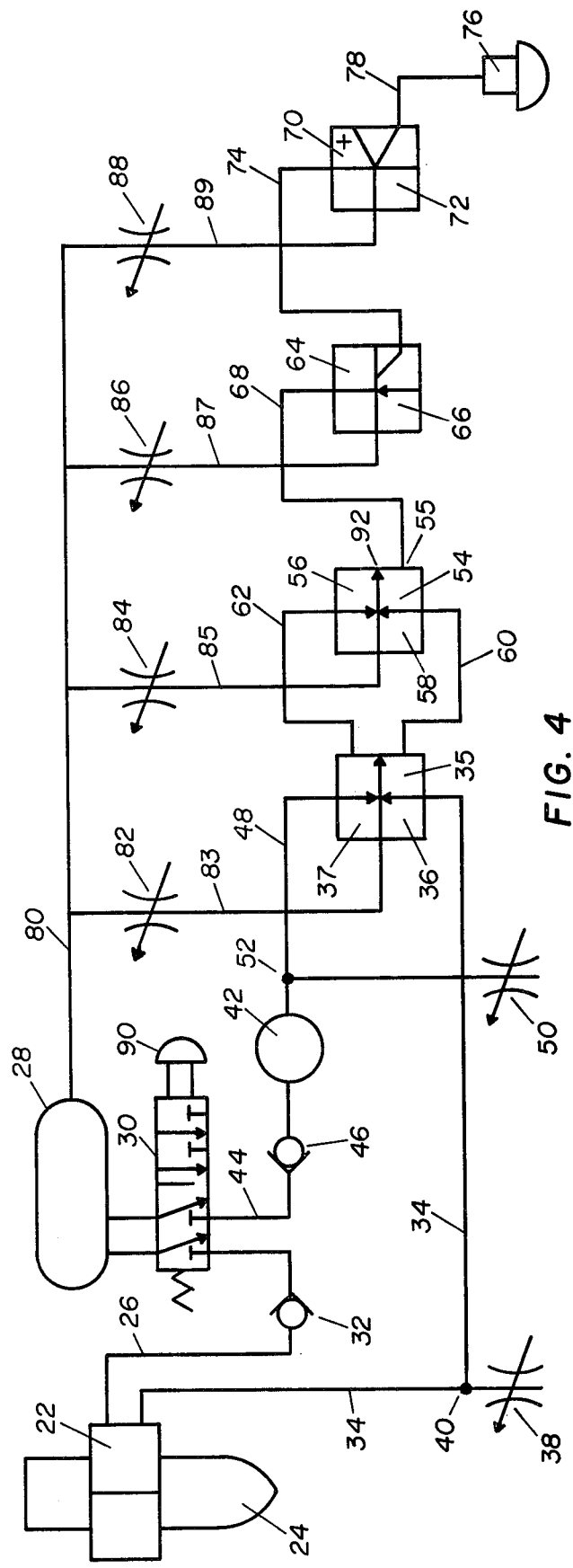

FLUIDIC GAP GAUGE

GOVERNMENTAL INTEREST

The invention described herein may be manufactured, used and licensed by or for the Government for governmental purposes without the payment to me of any royalty thereon.

BACKGROUND OF THE INVENTION

Various means have been used in the past to determine whether the gap between the shell body and the base plate of a projectile is excessive. It has been determined that under certain firing conditions assembly pins holding parts together are sheared and the base plate driven forward against the shell body. This movement, in turn, drives the fuze mechanisms and charges in the shell body forward, and on occasion has caused premature, in-bore detonation of the shell, with resultant catastrophic effect on the launch weapon and the gun firing crew.

In order to accurately measure the gap between the shell body and the base plate, the prior art utilized inspection techniques consisting of manually checking the periphery of the body-base joint with a feeler type hand held gauge. This method has been found to be unacceptable due to an inability to measure all types of out of tolerance conditions. This difficulty in determining out of tolerance gap distances is particularly prevalent in the instance where the rim of the base plate is thicker than the inner portion. In such circumstances a "no-go" feeler gauge used to measure the gap would indicate a "good" assembly, while in fact the assembly would be out of tolerance and probably hazardous to fire. In addition, the feeler gauge method has been found to be unreliable as a means for accurately measuring a gap in a projectile assembly because it was always dependent upon a subjective human response which could vary from person to person and from one time to another.

SUMMARY OF THE INVENTION

The present invention relates to a gauging system which utilizes a volume measuring technique to determine an average gap size upon which the gap size of a body-base interface geometry of a projectile assembly is either accepted or rejected. The present device comprises a split ring inclosing and sealing means for creating a volume around the body-base interface of a test projectile which is simultaneously pressurized along with a standard volume. The residual pressure of both volumes is compared by a fluidic amplifying, gating and indicating circuit to give a visual "go" signal for a test assembly which is less than a predetermined average gap size and a "no-go" signal for a test assembly which is greater than the predetermined average gap size.

An object of the present invention is to provide a fluidic gap sensor for testing the acceptability of a body-base gap interface of a projectile.

Another object of the present invention is to provide a fluidic gap sensor for accurately measuring the gap between the shell body and the base plate of a base dispensing type of projectile.

Another object of the present invention is to provide a fluidic gap sensor for reliably checking the size of the gap around the periphery of a body-base joint of a projectile without being dependent upon the manual use of a feeler gauge.

A further object of the present invention is to provide a fluidic gap sensor which is independent of the shell body-base interface geometry and utilizes a volume measuring system which indicates whether the test specimen meets a predetermined average gap size.

For a better understanding of the present invention, together with other and further objects thereof, reference is made to the following descriptions taken in connection with the accompanying drawings.

BRIEF DESCRIPTION OF THE DRAWINGS

FIG. 1 is a partial cross-sectional view of a shell body wall and base plate flange interface having a parallel gap $\alpha$ therebetween to be measured.

FIG. 2 is a partial cross-sectional view of a shell body wall and base plate flange interface where the rim of the shoulder of the base plate is thinner than the inner portion of the rim.

FIG. 3 is a partial cross-sectional view of a shell body wall and base plate flange interface where the rim of the base plate is thicker than the inner portion of the flange.

FIG. 4 is a diagramatic view of the split ring enclosure about the projectile and the attached measuring and indicating circuitry for determining acceptability of the shell body-base plate joint interface.

Throughout the following description like reference numerals are used to denote like parts of the drawings.

DESCRIPTION OF THE PREFERRED EMBODIMENTS

Referring now to FIGS. 1-3, these drawings illustrate a shell body 10 separated from a shell base plate 12 by an unwanted gap $\alpha$. FIG. 2 shows the condition where the rim 14 of the shoulder 16 of the base plate 12 is thinner than the inside section of the shoulder. In this case, a "no-go" feeler gauge could enter gap $\alpha$ and if the gap is within allowable tolerance the projectile could be properly assembled using these parts. In the aforementioned case, the inspector would have to determine if the gauge passed completely across shell body wall 10, indicating a "bad" assembly or stopped at some point radially outward, indicating a "good" assembly. The feeler gauge inserted in the gap would be marked for maximum permissible penetration and a judgement made as to the acceptability of the assembly. FIG. 3 shows an out of tolerance condition that cannot be adequately measured by a prior art feeler type gauge. In this latter case, the outer rim 18 of the base plate shoulder 20 is thicker than the inner section of the shoulder, resulting in a gap as illustrated. Under this latter gap condition a "no-go" feeler gauge used to measure the gap $\alpha$ would indicate a "good" assembly, while in fact the assembly would be out of tolerance and the projectile hazardous to fire.

Referring now to diagramatic view of the system in FIG. 4, the present invention utilizes a volume measuring system to determine the average gap size upon which the assembly will be accepted or rejected. A split-ring pressure enclosure 22 hermetically seals a volume circumferentially around the shell body-base plate interface gap $\alpha$, as shown in FIGS. 1-3, of the projectile 24. A pneumatic input line 26 is connected from the split-ring enclosure 22 to a pneumatic supply source 28 through a four-way six-ported manually controlled valve 30 and through a first unidirectional valve check 32. A pneumatic output line 34 from the split-ring enclosure 22 is connected to and utilized as an input to a first control port 35 of a first proportional pneumatic amplifier 36. A first variable restriction 38 is pneumatically connected to pneumatic line 34 at junction point 40 and is used to vent gases to the atmosphere and for balancing the system pneumatically during initial set-up. A reference volume 42 is similarly pneumatically connected via pneumatic input line 44 to the pneumatic power supply 28 through the manual control valve 30 and through a series connected second unidirectional check valve 46. Check valves 32 and 46 each guarantee gas supply flow in one direction only. Output line 48 pneumatically connects the reference volume 42 to a second control port 37 of the first fluidic proportional amplifier 36. A second variable restriction 50 is pneumatically connected to pneumatic line 48 at junction point 52 and is included in pneumatic line 48 for the purpose of pneumatically balancing the system during initial set-up conditions. The dual outputs of the first proportional amplifier 36 are connected to first and second control ports 54 and 56 respectively of the second proportional amplifier 58 via pneumatic lines 60 and 62 respectively. The output signal from signal output side 55 of the second fluidic proportional amplifier 58 is pneumatically connected to the control input port 64 of the fluidic Schmitt Trigger network 66 via pneumatic line 68. The output of Schmitt Trigger 66 is pneumatically connected to the control port 70 of a geometrically biased fluidic bi-stable gate 72 via pneumatic line 74. The output of the biased bi-stable pneumatic gate 72 is pneumatically connected to a pneumatic indicator 76 via pneumatic line 78. Fluidic power is supplied from the pneumatic supply source 28 to the first and second proportional amplifiers 36 and 58 respectively, the Schmitt trigger network 66, and to the bi-stable pneumatic gate 72 by a pneumatic line 80 through series connected fluidic variable restrictions 82, 84, 86 and 88 respectively. Third, fourth, fifth and sixth variable restrictions 82, 84, 86 and 88 respectively are utilized to adjust the supply pressure to the input supply lines 83, 85, 87 and 89 of the first and second proportional amplifiers, Schmitt Trigger, and bi-stable gate 36, 58, 66 and 72 respectively.

In operation, once the pneumatic power supply is initiated, the first and second fluidic proportional amplifiers 36 and 58 respectively, the Schmitt Trigger network 66, and the bi-stable gate 72 are brought up to operating power. The bi-stable gate 72 is geometrically normally biased so that when fluidic power is applied through restriction 88, its initial output is always in a given "off" state indicated by a + sign and the pneumatic indicator 76 in an "off" position visually indicating a "good" assembly. The split-ring enclosure 22 is then assembled around the projectile 24 and clamped in place. To initiate the test an operator depresses push button 90 of valve 30 causing the supply pressure to charge up the body-base gap volume as well as the reference volume 42 to the same pressure. The pneumatic lines 34 and 48 under this initial charging condition are at the same pressure, and the pressures in the output pneumatic lines 60 and 62 of the first proportional amplifier are therefore also equal. This makes the pressure in the output line 68 from the second fluidic proportional amplifier 58 less than that necessary to switch the Schmitt Trigger network 66. As a result, the pressure in the pneumatic line 74, to the bi-stable gate 72, is zero and the bi-stable gate 72 remains in its initial state. When the opeator releases push button 90 on valve 30, the supply pressure gas source 28 is removed from the body-base gap volume contained within split-ring enclosure 22 and from the reference volume 42. These two volumes than start to bleed down, from their higher than ambient pressure, to atmospheric pressure through the first and second control ports 35 and 37 respectively of the first fluidic proportional amplifier 36. Since both the volume contained within the split-ring enclosure 22 and the volume in the reference volume 42 are charged to the same pressure, the volume that is greater will bleed down to atmospheric pressure more slowly than the smaller volume. This results in a pressure differential between pneumatic lines 34 and 48. If the body-base gap volume is larger than the preselected reference volume 42 the pressure in line 34 will be greater than that in line 48. This difference in pressure is reflected in the signal outputs from the first fluidic proportional amplifier 36, such that the pressure in pneumatic line 62 will be greater than the pressure in pneumatic line 60. This differential in pressure than causes the second fluidic proportional amplifier 58 to switch and in turn provide a higher than normal pressure to the Schmitt Trigger network 66 via pneumatic line 68. This higher than normal pressure in pneumatic line 68, which is connected to the control input of the Schmitt Trigger 66, switches the Schmitt Trigger network 66 from an off position to an on position generating a pneumatic signal over pneumatic line 74 which causes bi-stable gate 72 to move from its initial "off" condition to the opposite output leg driving the fluidic indicator 76 via pneumatic line 78 to show a visual signal which indicates a "bad" assembly.

In the event that the shell body-base plate gap volume is less than that of the reference volume 42 the pressure in line 48 will be greater than that in line 34. This volume difference will cause the pressure in pneumatic line 60 to be greater than that in pneumatic line 62. This differential pressure presented to the control ports of the first fluidic proportional amplifier 36 drives the output from the second fluidic proportional amplifier 58 toward the vented output side 92. Under these conditions, since no signal is given to the Schmitt Trigger network 66, via pneumatic line 68, the fluidic indicator 76 remains in the initial state or "off" position indicating a "good" projectile assembly.

All fluidic components of the system can be separate as shown in FIG. 4, or can be mounted directly to the split-ring enclosure 22 for compactness in order to reduce line losses. In addition, since the two fluidic proportional amplifiers 36 and 58 only perform an amplification function, they could be replaced by a single multi-stage fluidic proportional gain block. A further modification of the circuit shown in FIG. 4 may have balancing restrictions 38 and 50 included in series with pneumatic lines 34 and 48 respectively leading into the first and second control ports 35 and 37 respectively of the first fluidic proportional amplifier 36, to eliminate the two vents to the atmosphere. Finally, the circuit may be modified to include a manual reset control to reset the bi-stable gating device 72 to its initial "off" state after experiencing a "bad" assembly.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the U.S. is:

1. A fluidic gap gauging system for checking a shell body-base plate gap of a projectile which comprises:
    split-ring hermetically sealed pressure enclosure means for circumferentially enclosing said shell body-base plate gap and creating a gap volume therein;
    a reference volume;
    pneumatic supply source means for generating a pressure within said split-ring enclosure means gap volume and said reference volume and supplying pneumatic power to said gauging system;
    valve means for simultaneously pneumatically pressurizing said split-ring enclosure means gap volume and said reference volume;
    fluidic proportional amplifier means for generating a pneumatic output signal in response to a differential pressure input signal;
    fluidic Schmitt Trigger means, having a control port pneumatically connected to the output of said fluidic proportional amplifier means switching from an off position to an on position and for generating a pneumatic signal in response to said output signal of said fluidic proportional amplifier means;
    a geometrically biased fluidic bi-stable gate having a control input port pneumatically connected to the output of said Schmitt-Trigger, said bi-stable gate being normally biased in a given "off" state;
    a pneumatic indicator pneumatically connected to the output of said geometrically biased fluidic bi-stable gate, said indicator giving a visual indication of a "bad" assembly when said split-ring enclosure means gap volume is greater than said reference volume, and giving a visual indication of a "good" assembly when said split-ring enclosure means gap volume is equal to or less than said reference volume; and
    fluidic restriction means for adjusting the supply pressure to said gauging system.

2. A fluidic gap gauging system as recited in claim 1 wherein said pneumatic supply source means comprises:
    a manually controlled valve pneumatically connected to said pneumatic supply source means;
    a first unidirectional check valve pneumatically disposed intermediate said manually controlled valve and said split-ring hermetically sealed pressure enclosure means;
    a second unidirectional check valve pneumatically disposed intermediate said manually controlled valve and said reference volume, said first check valve preventing the return of gas from said split-ring hermetically sealed enclosure means to said pneumatic supply source means and said second check valve preventing the return of gas from said reference volume to said pneumatic supply source means after said split-ring hermetically sealed enclosure means and said reference volume have been simultaneously pressurized by manual actuation of said manually controlled valve.

3. A fluidic gap gauging system as recited in claim 2 wherein said fluidic proportional amplifier means comprises:
    a first proportional pneumatic amplifier having first and second control ports and a dual output, said first control port being pneumatically connected to said split-ring enclosure means, said second control port being pneumatically connected to said reference volume;
    a first variable restriction pneumatically connected at a pneumatic junction point intermediate said split-ring enclosure means and said first control port of said first proportional pneumatic amplifier;
    a second variable restriction pneumatically connected at a pneumatic junction point intermediate said reference volume and said second control port of said first proportional amplifier, said first and second variable restrictions being adjusted to vent gases from said split-ring enclosure means and said reference volume respectively and for pneumatically balancing said gauging system during initial set-up; and
    a second proportional pneumatic amplifier having first and second control ports, said first and second control ports being pneumatically connected to the dual output of said first proportional pneumatic amplifier, said second proportional pneumatic amplifier having a vented output side and a signal output side, said signal output side being pneumatically connected to said control port of said fluidic Schmitt Trigger means when said split-ring enclosure means gap volume is greater than said reference volume.

4. A fluidic gap gauging system as recited in claim 3 wherein said fluidic restriction means comprises:
    a first restriction pneumatically disposed intermediate said pneumatic supply source means and the input supply of said first proportional amplifier;
    a second restriction pneumatically disposed intermediate said pneumatic supply source means and the input supply of said second proportional amplifier;
    a third restriction pneumatically disposed intermediate said pneumatic supply source means and the input supply of said fluidic Schmitt Trigger means; and
    a fourth restriction pneumatically disposed intermediate said pneumatic supply source means.

* * * * *